United States Patent [19]
Brooks
[11] 3,862,406
[45] Jan. 21, 1975

[54] DATA REORDERING SYSTEM

[75] Inventor: Billy S. Brooks, Tustin, Calif.
[73] Assignee: Interstate Electronics Corporation, Anaheim, Calif.

[22] Filed: Nov. 12, 1973
[21] Appl. No.: 415,177

[52] U.S. Cl. .................. 235/152, 307/208
[51] Int. Cl. .................. G06f 5/00
[58] Field of Search ........ 235/152, 156; 333/18, 29; 307/208; 340/172.5

[56] References Cited

UNITED STATES PATENTS

| | | | |
|---|---|---|---|
| 3,141,153 | 7/1964 | Klein | 333/29 X |
| 3,369,220 | 2/1968 | Buyer et al. | 333/18 X |
| 3,457,369 | 7/1969 | Davies et al. | 333/29 X |
| 3,510,851 | 5/1970 | Nakagomb et al. | 333/29 X |
| 3,634,666 | 1/1972 | Ragen | 235/156 |
| 3,781,822 | 12/1973 | Ahamed | 235/156 |

OTHER PUBLICATIONS

Dieffenderfer et al., IBM Tech. Discl. Bulletin, Pipeline Fast Fourier Transform Processor, Vol. 16, No. 2, July 1973, pp. 530–533.

*Primary Examiner*—Charles E. Atkinson
*Attorney, Agent, or Firm*—Knobbe, Martens, Olson, Hubbard & Bear

[57] ABSTRACT

A combination of delays and programmed switches is used to convert serial data in reverse binary order to normal binary order or to convert data in normal binary order to data in reverse binary order.

8 Claims, 2 Drawing Figures

Patented Jan. 21, 1975

3,862,406

2 Sheets-Sheet 1

FIG. 2.

| TIME | COUNTER 57 | | | | SWS. 17&19 1-4=B | COUNTER 59 | | | | SWS. 21&23 2-3=B | FIRST POSITION IN INPUT REGISTER 11 COEFFICIENT NUMBER | DELAY 13 | | | | | | | DELAY 15 | | FIRST POSITION IN OUTPUT REGISTER 55 COEFFICIENT NUMBER |
|---|---|---|---|---|---|---|---|---|---|---|---|---|---|---|---|---|---|---|---|---|---|
| | 4 | 3 | 2 | 1 | | 4 | 3 | 2 | 1 | | | 1 | 2 | 3 | 4 | 5 | 6 | 7 | 2 | 1 | |
| | | | | | | 0 | 0 | 0 | 0 | A | | | | | | | | | | | |
| | | | | | | 0 | 0 | 0 | 1 | A | | | | | | | | | | | |
| 0t | 0 | 0 | 0 | 0 | A | 0 | 0 | 1 | 0 | A | 0 | | | | | | | | | | |
| 1t | 0 | 0 | 0 | 1 | A | 0 | 0 | 1 | 1 | A | 8 | 0 | | | | | | | | | |
| 2t | 0 | 0 | 1 | 0 | A | 0 | 1 | 0 | 0 | A | 4 | 8 | 0 | | | | | | | | |
| 3t | 0 | 0 | 1 | 1 | A | 0 | 1 | 0 | 1 | A | 12 | 4 | 8 | 0 | | | | | | | |
| 4t | 0 | 1 | 0 | 0 | A | 0 | 1 | 1 | 0 | B | 2 | 12 | 4 | 8 | 0 | | | | | | |
| 5t | 0 | 1 | 0 | 1 | A | 0 | 1 | 1 | 1 | B | 10 | 2 | 12 | 4 | 8 | 0 | | | | | |
| 6t | 0 | 1 | 1 | 0 | A | 1 | 0 | 0 | 0 | A | 6 | 10 | 2 | 12 | 4 | 8 | 0 | | | | |
| 7t | 0 | 1 | 1 | 1 | A | 1 | 0 | 0 | 1 | A | 14 | 6 | 10 | 2 | 12 | 4 | 8 | 0 | | | |
| 8t | 1 | 0 | 0 | 0 | A | 1 | 0 | 1 | 0 | A | 1 | 14 | 6 | 10 | 2 | 12 | 4 | 8 | 0 | | |
| 9t | 1 | 0 | 0 | 1 | B | 1 | 0 | 1 | 1 | A | 9 | 8 | 14 | 6 | 10 | 2 | 12 | 4 | 1 | 0 | |
| 10t | 1 | 0 | 1 | 0 | A | 1 | 1 | 0 | 0 | A | 5 | 9 | 8 | 14 | 6 | 10 | 2 | 12 | 4 | 1 | 0 |
| 11t | 1 | 0 | 1 | 1 | B | 1 | 1 | 0 | 1 | A | 13 | 12 | 9 | 8 | 14 | 6 | 10 | 2 | 5 | 4 | 1 |
| 12t | 1 | 1 | 0 | 0 | A | 1 | 1 | 1 | 0 | B | 3 | 13 | 12 | 9 | 8 | 14 | 6 | 10 | 4 | 5 | 2 |
| 13t | 1 | 1 | 0 | 1 | B | 1 | 1 | 1 | 1 | B | 11 | 10 | 13 | 12 | 9 | 8 | 14 | 6 | 5 | 4 | 3 |
| 14t | 1 | 1 | 1 | 0 | A | 0 | 0 | 0 | 0 | A | 7 | 11 | 10 | 13 | 12 | 9 | 8 | 14 | 6 | 5 | 4 |
| 15t | 1 | 1 | 1 | 1 | B | 0 | 0 | 0 | 1 | A | 15 | 14 | 11 | 10 | 13 | 12 | 9 | 8 | 7 | 6 | 5 |
| 16t | 0 | 0 | 0 | 0 | A | 0 | 0 | 1 | 0 | A | | 15 | 14 | 11 | 10 | 13 | 12 | 9 | 8 | 7 | 6 |
| 17t | 0 | 0 | 0 | 1 | A | 0 | 0 | 1 | 1 | A | | | 15 | 14 | 11 | 10 | 13 | 12 | 9 | 8 | 7 |
| 18t | 0 | 0 | 1 | 0 | A | 0 | 1 | 0 | 0 | A | | | | 15 | 14 | 11 | 10 | 13 | 12 | 9 | 8 |
| 19t | 0 | 0 | 1 | 1 | A | 0 | 1 | 0 | 1 | A | | | | | 15 | 14 | 11 | 10 | 13 | 12 | 9 |
| 20t | 0 | 1 | 0 | 0 | A | 0 | 1 | 1 | 0 | B | | | | | | 15 | 14 | 11 | 12 | 13 | 10 |
| 21t | 0 | 1 | 0 | 1 | A | 0 | 1 | 1 | 1 | B | | | | | | | 15 | 14 | 13 | 12 | 11 |
| 22t | 0 | 1 | 1 | 0 | A | 1 | 0 | 0 | 0 | A | | | | | | | | 15 | 14 | 13 | 12 |
| 23t | 0 | 1 | 1 | 1 | A | 1 | 0 | 0 | 1 | A | | | | | | | | | 15 | 14 | 13 |
| 24t | 1 | 0 | 0 | 0 | A | 1 | 0 | 1 | 0 | A | | | | | | | | | | 15 | 14 |
| 25t | 1 | 0 | 0 | 1 | B | 1 | 0 | 1 | 1 | A | | | | | | | | | | | 15 |
| | 1 | 0 | 1 | 0 | A | 1 | 1 | 0 | 0 | A | | | | | | | | | | | |
| | | | | | | | | | | | | | | | | | | | | | |

DATA REORDERING SYSTEM

BACKGROUND OF THE INVENTION

This invention relates to data reordering systems and more particularly to systems for reordering data from reverse binary order to normal binary order or vice-versa.

In certain calculations typically carried out by special purpose or general purpose digital computers, data is produced in reverse binary order due to the operation of a particular computational algorithm. This reverse ordering is often an inconvenience since the data can only properly be utilized in normal order. This inconvenience occurs, by way of example, in the calculation of the fast Fourier transform algorithm where real time data may be serially sampled for calculation to produce a discrete Fourier transform. In this instance, the frequency domain coefficients are produced by the algorithm in reverse binary order.

If the data is stored in a random access memory, the inconvenience is relatively minor. If, however, serial access memory is being used for the computation, reordering is often necessary before the result may be effectively used, as for presentation on a display device.

By way of background, data samples in many computations such as, for example, the fast Fourier transform computation are arranged in an array of fixed length in a given system. Thus, for example, data may be sampled on a real time basis for a Fourier transform until N coefficients have been collected in a serial register. The computation for transforming this data to its corresponding frequency domain coefficients is then conducted on each set of N time domain data samples to produce N frequency domain coefficients, typically in serial form. The time domain data samples may be consecutively numbered in binary notation from 0 to N−1. Such notation requires $n$ digits to count all of the data in a given array where $n = \sqrt{N}$.

The fast Fourier computation will produce N frequency domain coefficients which are in reverse binary order, that is, coefficient number $2^{n-1}(X_1) + 2^{n-2}(X_2) + \ldots 2X_{n-1} + X_n$ is in position number $2^{n-1}(X_n) + 2^{n-2}(X_{n-1}) + \ldots + 2X_2 + X_1$ where the X's are the binary digits 1 or 0. Thus, in a 16 point array, the coefficient number 12, for example, would be coefficient number 1010. If these bits are read in reverse order the coefficient would occupy position number 0101, or the fifth position. In order to utilize the data for display, for example, the data which is in position number 5 must be reordered to position number 12, the position it would occupy in a normally ordered array.

By way of further example, the following 3-digit series is the binary notation, when N=8, counting from 0 through 7.

0 = 000
1 = 001
2 = 010
3 = 011
4 = 100
5 = 101
6 = 110
7 = 111

If the binary numbers are used in reverse order the sequence appears as follows.

000 = 0
100 = 4
010 = 2

110 = 6
001 = 1
101 = 5
011 = 3
111 = 7

Thus, the fourth coefficient occupies the second position in the array, and so on.

Stated differently, reverse binary order is defined as the order achieved when the order of the binary digits of words in normal sequential order is reversed, that is, 110 becomes 011, so that for N=8 the third coefficient appears where the sixth coefficient would appear if the order were normal, or for N=32 01100 (12) becomes 00110 (6).

Previous methods include the storage of data in two serial files and the examination of files repeatedly. The first time through one coefficient is taken from each file and the two are stored consecutively in a third file. This process is repeated until the third file is full and then a fourth file is used. Files 3 and 4 then become the input with 1 and 2 the output and two coefficients at a time are taken from each file, then four at a time, eight at a time, etc. The disadvantages of this approach are that data are read intermittently from each file and the total storage is excessive.

Another prior art technique is the collection of the series data in a register and the hard wired transfer of the data in this register to a second register, in parallel, the wiring between the registers being arranged to transfer the data to its proper location for normal binary order in the second register. For large data sets, this technique requires extremely large registers.

SUMMARY OF THE INVENTION

The present invention is directed toward reordering data from normal to reverse or reverse to normal binary order without the necessity of random access memory or excessive storage capability and without the requirement for parallel access to serially addressable storage media, so that the reordering can occur through a series of delays which are interconnected by programmed switches. The switches are sequenced or programmed by a system clock so that a portion of the data is circulated or recirculated through selected combinations of delays and a portion of the data may be bypassed around certain combinations of the delays, thus resulting in a reordered output at the last of the programmed switches.

In addition, it has been found that a combination of certain of the bits of a normal binary counter circuit may be used to program the switches which interconnect the delay circuits, so that the entire system may be constructed economically and simply by using standard components.

These and other advantages of the present invention may be better understood by reference to the drawings, in which:

FIG. 1 is a schematic illustration of the circuit, partially in block diagram form, of the present invention; and FIG. 2 is a chart showing the transfer of data as a function of time through the circuit of FIG. 1.

DETAILED DESCRIPTION OF THE PREFERRED EMBODIMENT

Figure 1:
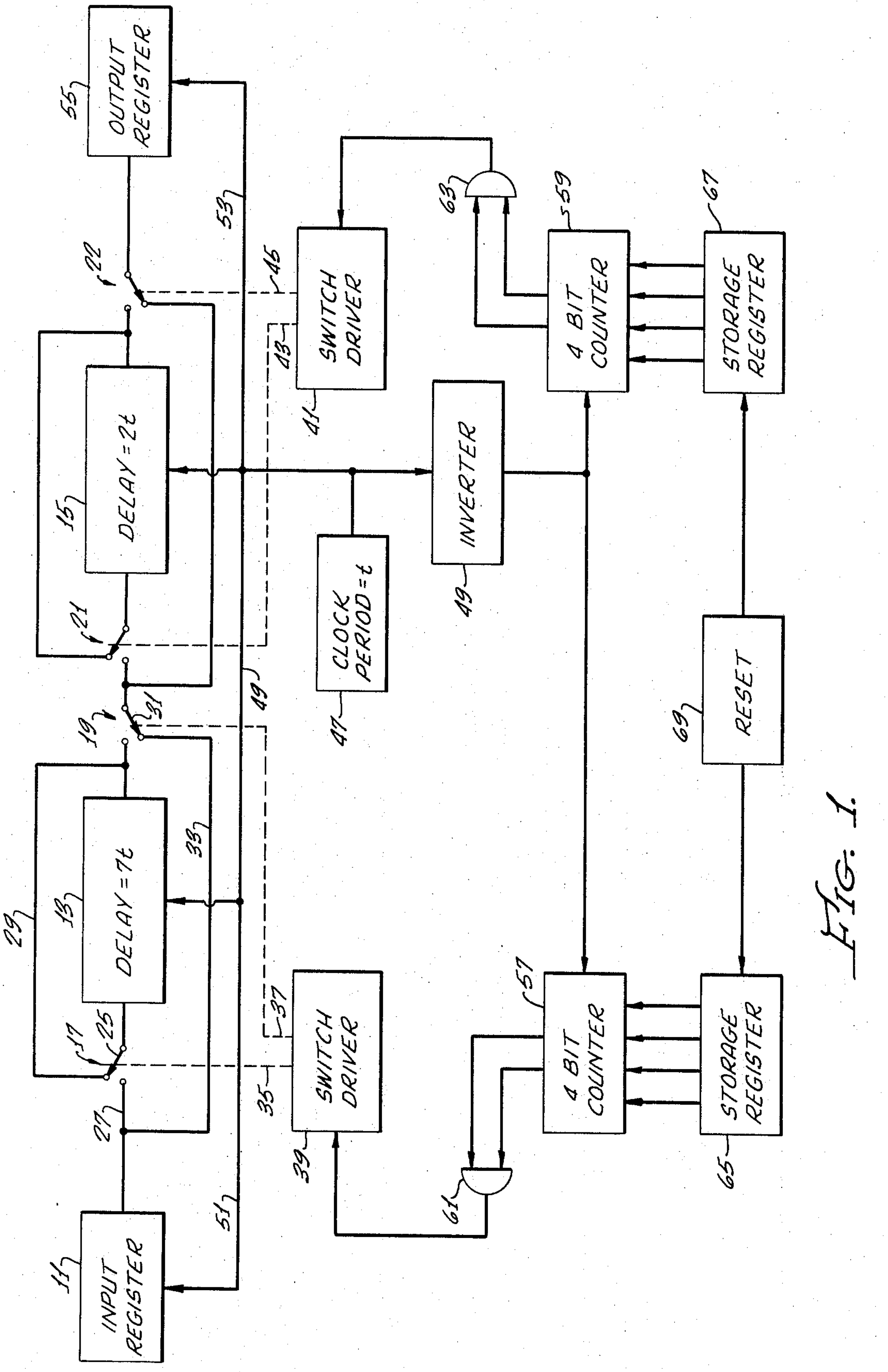

A detailed description of the discrete Fourier transform and the fast Fourier transform algorithm is included in U.S. Pat. No. 3,721,812, assigned to the same assignee as the present invention. That patent is incorporated herein by reference for the purpose of description of an exemplary computational algorithm which produces coefficients in reverse binary order. In the present instance, it is assumed that the coefficient words are produced from serially accessed input time domain data and that the frequency domain coefficients so produced are in reverse binary order in a serial access input register 11 shown in FIG. 1. Throughout the present description, the term binary data is intended to include binary words of multiple digits. These words are present in the input register 11 in word parallel form, but the words themselves exist within the register 11 in series.

As previously explained, the order of these data or coefficient words is reverse binary, that is coefficient number $2^{n-1}(X_1) + 2^{n-2}(X_2) + \ldots + 2X_{n-1} + X_n$ is in position number $2^{n-1}(X_n) + 2^{n-2}(X_{n-1}) + \ldots + 2X_2 + X_1$, where the X's are the binary digits 1 or 0. The present invention reorders this data to normal binary order by routing the data through a series of delays and switches.

The delays required for an N point array, that is, for a data set having N data words, are $(N/2-1)t$, $(N/4-2)t$, $(N/8-4)t$, etc. where t is the period of a system clock, down to the point where the time delay becomes 0 or negative. Thus, an eight point array for example would require one delay of length $3t$ while a 64 point array would require delays of 31t, 14t and 4t. In the exemplary embodiment shown in FIGS. 1 and 2 and used to describe the present invention, it is assumed that the system is designed to reorder 16 point arrays, that is, N=16. For such a system, the first delay has a duration of $(N/2-1)t = (8-1)t = 7t$, the second delay $(N/4-2)t = (4-2)t = 2t$, and remaining delays are not used since $(N/8-4)t = (2-4)t = -2t$.

At each delay there are a set of switches which are at either a position A or a position B. At position A, arriving data enter the delay and data emerging from the delay go to the next stage. At position B, arriving data are routed directly to the next stage while data emerging from the delay reenter the input of the same delay. The sequence of A and B positions for each of the delays in any N point array system is as follows:

$$\text{For delay}=(N/2-1)t,\ \overbrace{\text{AA - - - - - - A}}^{(N/2)t}\ \overbrace{\text{BA BA - - - BA}}^{(N/2)t},\ \text{then repeat}$$

$$\text{For delay}=(N/4-2)t,\ \overbrace{\text{AA - - - A}}^{(N/4)t}\ \overbrace{\text{BBAABBAA - - - BBAA}}^{(N/4)t},\ \text{then repeat}$$

$$\text{For delay}=(N/8-4)t,\ \overbrace{\text{AA - - - A}}^{(N/8)t}\ \overbrace{\text{BBBBAAAA - - - - - BBBBAAAA}}^{(N/8)t},\ \text{repeat}$$

Turning once again to FIG. 1, the two delays required for a 16 point array have durations $7t$ and $2t$, and are shown at 13 and 15. A pair of switches 17 and 19 are connected to the $7t$ delay 13 so that, in accordance with the previous formula, the switches 17 and 19 are in position A for a period $(N/2)t$, or a period of $8t$, then each oscillate between position B and position A for a period of $8t$, and then this sequence repeats.

Similarly, a pair of switches 21 and 22 are connected to the delay 15 and are operated such that each of these switches is in position A for $(N/4)t$ or $4t$, the switches are then in the B position for $2t$ followed by the A position for $2t$, and then the sequence repeats as defined in the preceding formula. The switching sequence thus repeats for each of the switches 17, 19, 21 and 23.

Specifying the switches 17 and 19 in more detail, it will be noted that a wiper 25 of the switch 17 is connected to the input of the delay 13. When the wiper 25 contacts the A position of the switch 17, the input of the delay 13 is connected directly to the output of the input register 11 through a line 27. When the wiper 25 is in position B, the input of the delay 13 is connected through a line 29 directly to the output of the delay 13.

A wiper 31 of the switch 19 is connected to the next delay stage. When the wiper 31 is in position A, data emerging from the delay 13 is conducted directly to the next stage. When the wiper 31 is at position B, data from the input register 11 is channeled around the delay 13 through a line 33 directly to the next stage.

It will thus be appreciated that, if the switches 17 and 19 are operated in unison, when these switches are in position A, data emerging from the input register 11 will enter the delay 13 and data emerging from the delay 13 will be conducted to the next stage. On the other hand, if each of the switches 17 and 19 is in position B, data emerging from the input register 11 will be conducted directly to the next stage and data emerging from the delay 13 will be conducted to the input of the delay 13.

Switches 21 and 23 are arranged in identical fashion with switches 17 and 19.

A pair of connecting links 35 and 37 connect the switch wipers 25 and 31 to a switch driver 39 which operates these switches in unison. It will be understood that the switches 17 and 19 may be solid state devices and that the switch driver 39 may be connected to these devices electrically rather than mechanically, so that the embodiment shown is exemplary. Similarly, a switch driver 41 through a pair of linkages 43 and 45 is connected to drive switches 21 and 23 in parallel, so that whenever switch 21 is in position A, switch 23 will likewise be in position A, and similarly for position B.

A clock 47 is used to output periodic pulses and thereby direct the sequence of events of the entire system and is therefore connected through lines 49, 51 and 53 to clock data through and out of the input register 11, through the delay 13, through the delay 15 and through an output register 55 which accepts data from the last delay stage 15 through the switch 23. It will be understood by those familiar with digital circuitry that each of the registers 11 and 55 and the delays 13 and 15 may be shift registers which are of predetermined length and that the clock 47 shifts data through each of the shift registers, so that the delay 13 for example is a seven position shift register and the delay 15 is a two position shift register. Thus data that has been clocked into the delay 15 will be clocked into the first of two shift register positions and will be clocked into the second position on the next clock pulse. The third clock pulse to the delay 15 will clock the data in position 2 to the output of the delay 15. Thus, if the clock 47 has a period $t$, delay 13 delays coefficients for a period of $7t$, and delay 15 a period of $2t$.

The clock 47 is additionally connected to an inverter 49 which is placed in the circuit to invert the clock pulses and assure that each of the switches 17, 19, 21 and 23 is activated to change position only between the clock pulses from the clock 47 which shift data within the registers 11, 13, 15 and 55. Thus, each of the switches 17 through 23 will be positioned between clock pulses and data will then be shifted within and between registers by the clock pulse while the switches are stationary. The inverter 49 is connected to a pair of 4-bit binary counters 57 and 59 which are used, as will be explained below, to program the switch drivers 39 and 41. The most significant bit and least significant bit of the counter 57 are connected to an AND gate 61, and the output of the AND gate 61 is connected to the switch driver 39 such that, whenever both the most significant and least significant bits of the 4-bit counter 57 are true, the switch driver 39 will drive the switches 17 and 19 to the B position. Similarly, the second least significant bit and the second most significant bit of the counter 59 are connected to an AND gate 63 which is, in turn, connected to the switch driver 41 such that, whenever both these bits of the counter 59 are true, the switch driver 41 will drive the switches 21 and 23 to the B position. At all other times, the switch drivers 39 and 41 drive switches 17, 19, 21 and 23 to the A position.

Referring now to FIG. 2, the sequence of counts within the 4-bit counter 57 are displayed. It will be recognized that the most significant bit, bit 4 in FIG. 2, and the least significant bit, bit 1 in FIG. 2, are both true, that is have a value of 1, in a predetermined sequence. This sequence is precisely the sequence required for energizing the switches associated with the $(N/2-1)t$ delay as previously discussed. Thus, the switches are in position A for a count of $(N/2)t$ and oscillate between positions B and A for a count of $(N/2)t$.

Similarly, as shown in FIG. 2, the second most significant bit, bit 3 of the counter 59 of FIG. 2, and the second least significant bit, bit 2 of the counter 59 in FIG. 2, may be combined in an AND gate to produce precisely the sequence which is required for operation of the switches associated with the $(N/4-2)t$ delay as described previously.

It has been found that for any $\sqrt{N}$ point array, counters may be used to drive all of the required switch pairs, these counters having N bits and being arranged such that for the first delay, the most significant bit and the least significant bit are combined in an AND gate to produce the B position. For the second delay in the array, the second most significant and second least significant bits are similarly combined. For the third delay, the third most significant bit and third least significant bit are combined in a similar fashion, and so on until each of the switch pairs has been accounted for.

It will be noted, however, that if the second most significant bit and second least significant bit of the counter 57 rather than the counter 59 were used to drive the switches 21 and 23 of FIG. 1, these switches would be out of their proper phase relationship with switches 17 and 19. That is, in order to properly phase all of the switches according to the switch programs explained above, the count of counter 59 must proceed in advance of that of counter 57 by two counts. Thus, as shown in FIG. 2, at time $0t$, counter 57 should properly begin its sequence at a count of 0000, or 0, and counter 59 at a count of 0010, or 2.

This is accomplished in the preferred embodiment, as shown in FIG. 1, by connecting a pair of storage registers 65 and 67 for resetting the counters 57 and 59 through a parallel input of bits stored in the storage registers 65 and 67. In the preferred example, the storage register 65 stores the binary number 0000 and the register 67 stores a binary number 0010. Thus, through the use of a reset input device 69, a signal is produced for initiating the system, which signal shifts the numbers stored in storage registers 65 and 67 into the counters 57 and 59 to initiate the reordering sequence. This occurs at time $0t$ as shown in FIG. 2.

As shown in FIG. 2, the initial parameters of the system are thus as follows: counter 57 stores a count of 0000, counter 59 stores a count of 0010, switches 17 and 19 are in the A position, switches 21 and 23 are in the A position, the last position in the shift register 11 is storing the initial input coefficient, coefficient 0, and the delays 13 and 15 are empty; that is, contain no coefficients.

Midway between time $0t$ and time $1t$, due to the inverter 49, counter 57 and counter 59 will advance one count, so that counter 57 stores the count 0001 and the counter 59 stores the count 0011. At time $1t$ the clock 47 shifts data in each of the shift registers. The switches 17, 19, 21 and 23 remain in the A position so that the initial coefficient of the reverse binary series in the input register 11, coefficient 0, is shifted to the first position in delay 13. During the following $6t$ period, switches 17 and 19 remain in the A position so that up until time $7t$ each input coefficient arriving at the last stage of the input register 11 will be shifted into the first stage of the delay 13. Thus, at time $7t$, the delay 13 is full and stores the first seven words of the reverse binary sequence. At time $8t$, switches 17, 19, 21 and 23 are in the A position and thus the first coefficient, coefficient 0, is shifted from the last stage of the delay 13 to the first position of the delay 15.

Midway between time $8t$ and time $9t$ switches 17 and 19 are driven to the B position while switches 21 and 23 remain in the A position. Thus, at time $9t$ when the coefficient number 8 is shifted out of the last stage of the delay 13, it will be routed by a line 29 of FIG. 1 back to the initial stage of the delay 13. Coefficient 0 will be stepped to the second position of the delay 15 and coefficient 1, which has been shifted out of the input register 11, will be routed around the delay 13 by a line 33 of FIG. 1 and will enter the first stage of the delay 15.

The sequence of FIG. 2 follows a pattern such as that described above, wherein some of the data will bypass one or both of the delays 13 and 15, some of the data will be delayed once in only one of the delays 13 and 15 or once in each of these delays, and some of the coefficients will be routed to pass through one or both of the delays 13 and 15 a second time. In this fashion it can be seen that the data finally appearing at the first stage of the output register 55 is in normal binary order, beginning midway between time $9t$ and time $10t$.

Thus, the individual coefficients of the reverse binary sequence in the input register 11 are routed through different combinations of the delays 13 and 15 in order to properly sequence the data so that it will properly arrive at the output stage 55 in the normal order.

A study of FIGS. 1 and 2 will make it apparent to those skilled in the art that if the input register 11 stores data in normal binary order rather than reverse binary order, this data will also be reordered and will appear in reverse binary order at the output register 55 so that this system may be used to reorder data in either direction.

Although separate counters 57 and 59 had been used in the example shown in FIG. 1 in order to properly phase the time sequence program of the switches 17, 19, 21 and 23, it will be apparent that a single counter could be used with a first AND gate connected to the most and least significant bits and a second AND gate connected to the second most significant bit and second least significant bit. This arrangement requires a delay, in this case, a delay of $2t$, coupled to the output of the latter AND gate to properly phase the switch operations.

What is claimed is:

1. A circuit for reordering a set of N input coefficients stored in a serial access input register in reverse binary order to normal binary order in a serial access output register, comprising:

means for clocking data from said input register and into said output register, said clocking means having a period $t$;

a plurality of delay circuits having progressively decreasing delay periods, said delay periods equal to $(N/2-1)t$, $(N/4-2)t$, $(N/8-4)t$, etc.; and a plurality of switching means connecting each circuit stage including said delay circuits and said input and output registers in series, said switching means alternately having:

a. an A position connecting coefficients received from the preceding circuit stage to said delay circuit and coefficients from said delay circuit to the succeeding circuit stage, or b. a B position connecting coefficients received from the preceding circuit stage to the succeeding circuit stage and coefficients from said delay circuit for recirculation through said delay circuit; and means for driving said switching means between said A and B positions in a predetermined sequence as follows:

a. for the switching means associated with said $(N/2-1)t$ delay, said switching means are maintained in said A position for a period of $(N/2)t$, then switched in a sequence B,A,B,A,B . . ., remaining in each position for a period t, until a period of $(N/2)t$ has elapsed, then repeat the sequence, beginning with the A position for a period of $(N/2)t$;

b. for the switching means associated with said $(N/4-2)t$ delay, said switching means are maintained in said A position for a period of $(N/4)t$, then switched in a sequence B,B,A,A,B,B,A,A . . ., remaining in each position for a period t, until a period of $(N/4)t$ has elapsed, then repeat the sequence, beginning with the A position for a period of $(N/4)t$;

c. for the switching means associated with said $(N/8-4)t$ delay, said switching means are maintained in said A position for a period of $(N/8)t$, then switched in a sequence B,B,B,B,A,A,A,A,B,B,B,B . . . , remaining in each position for a period $t$, until a period of $(N/8)t$ has elapsed, then repeat the sequence, beginning with A position for a period of $(N/8)t$;

d. and, following the same progressive order, decreasing the period for maintenance in the A position and the B to A switching sequence by a factor of two for each successive delay circuit and increasing the duration of the B and A positions during the switching sequence by a factor of two for each successive delay circuit, for each of the remaining delay circuits.

2. A circuit for reordering a set of N input coefficients as defined in claim 1 wherein said switch driving means comprises:

counting means responsive to said data clocking means for counting time in periods of $t$ length.

3. A circuit for reordering a set of N input coefficients as defined in claim 2 wherein said means for driving said switching means additionally comprises:

means responsive to the most significant bit and the least significant bit of said counting means for driving said switching means associated with said $(N/2)t$ delay;

means responsive to the second most significant bit and the second least significant bit of said counting means for driving the switching means associated with said $(N/4-2)t$ delay;

means responsive to the third least significant bit and the third most significant bit of said counting means for driving the switching means associated with said $(N/8-4)t$ delay; and following the same progressive order for each of the remaining switching means.

4. A circuit for reordering a set of N input coefficients as defined in claim 1 wherein said switching means comprises a pair of two position switches, one of said switches having a switch wiper connected to the input of said delay circuit for alternate connection to the preceding circuit stage or the output of said delay circuit and the second switch having a wiper connected to the succeeding circuit stage for alternate connection to the output of said delay means or the preceding circuit stage.

5. Apparatus for reordering sets of N serially available input coefficients in reverse binary order to sets of N serially available output coefficients in normal binary order, comprising:

a plurality of circuit stages, connected in series, each stage comprising:

delay means for storing for a predetermined time period selected coefficients received from the preceding circuit stage; and switching means connected between said delay means and the preceding and succeeding circuit stages, for alternately conducting:

a. coefficients received from the preceding circuit stage to said delay means and coefficients from said delay means to the succeeding circuit stage, or b. coefficients received from the preceding circuit stage to the succeeding circuit stage and coefficients from said delay means for recirculation through said delay means.

6. Apparatus for reordering coefficients as defined in claim 5 additionally comprising:

means for driving said switching means in predetermined patterns, the driving means associated with each of said circuit stages having a different pattern.

7. A method of reordering serially available input coefficients from a first binary order to a second binary order, comprising:

conducting first selected ones of said input coefficients through a time delay apparatus once;

conducting second selected ones of said input coefficients through said time delay apparatus twice; and conducting third selected ones of said input coefficients to bypass said time delay apparatus.

8. A method of reordering serially available input coefficients as defined in claim 7 additionally comprising:

conducting fourth selected ones of said first, second and third selected ones of said input coefficients through a second time delay apparatus once;

conducting fifth selected ones of said first, second and third selected ones of said input coefficients through said second time delay apparatus twice; and conducting sixth selected ones of said first, second and third selected ones of said input coefficients to bypass said second time delay apparatus.

* * * * *